United States Patent Office 3,493,045
Patented Feb. 3, 1970

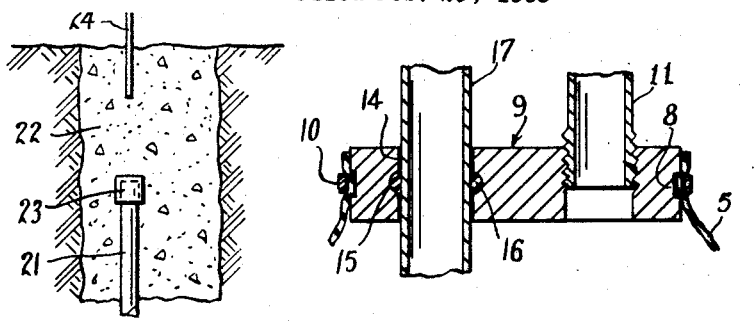
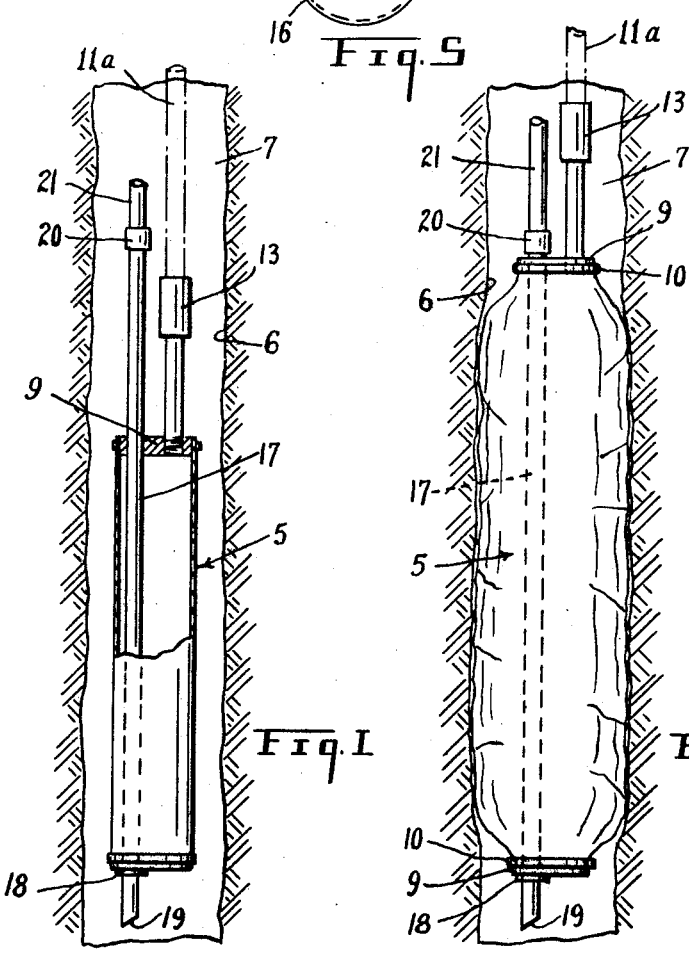

3,493,045
FLUID PRESSURIZED SHOTHOLE PLUG AND WATER CONTROL DEVICE
Peppino Bassani, 14248 Laurier Drive,
Edmonton, Alberta, Canada
Filed Feb. 29, 1968, Ser. No. 709,366
Int. Cl. E21b *33/127*
U.S. Cl. 166—187             4 Claims

ABSTRACT OF THE DISCLOSURE

An inflatable sleeve for sealing-off seismic bore holes including an inflatable, radially and longitudinally expansible bag having a pair of end caps, a fluid inlet pipe secured to an upper of the pair of end caps, a check valve in the fluid inlet pipe, a fluid up-flow pipe passing through the inflatable bag and its end caps, a pair of stops on the up-flow pipe to limit the longitudinal expansion of the inflatable bag and sealing means between the said up-flow pipe and the end caps.

---

This invention relates to a fluid pressurized shothole plug and water control device adapted to seal-off seismic bore holes to prevent ingress of subsurface water into the holes and to control the flow of water out of the holes while a plug at the surface is setting.

In a seismic boring program, a large number of bore holes are preferably made over a selected area, most of which are ultimately closed-off by means of a cement plug. However, such bore holes often strike water and become in fact, artesian wells. The owner of the land may or may not wish to make use of the water thus discovered. On the other hand should he wish to make use of the well at a later date, the present invention permits easy opening up of the well.

In sealing-off such wells, the presence of a large flow of water into the bore hole presents a problem during the sealing operation. In the past, means for sealing-off the bore hole required the use of expensive equipment, in many cases involving the use of well casings and intricate means for sealing off the casing which had to be left within the bore hole.

The present invention makes use of an inflatable sleeve, a fluid inlet pipe whereby fluid is pumped into the sleeve through a check valve, the inflatable sleeve being capable of accommodating itself, when inflated, to seal the surface of relatively rough bore holes. The sleeve is expandable longitudinally on a pipe which passes through a pair of end caps and the expansion of the sleeve longitudinally is limited by a pair of stops on the through pipe.

It is an object of the invention to provide means whereby seismic bore holes can be sealed off and, at the same time provide means whereby a water strike in the bore hole can be made available in a controlled manner for immediate use or at a later date.

A further object of the invention is to provide means whereby the flow of water struck in a seismic bore hole can be shut off by an expansion plug using fluid means to expand the plug while permitting water below the plug to flow through the plug until such time as a permanent seal above the plug is set.

A further object of the invention is to provide means whereby a seismic bore hole can be efficiently sealed off at any desired depth against a large inflow of water into the bore hole.

These and other objects of the invention will be apparent from the following the detailed specification and the accompanying drawings in which FIG. 1 is a vertical section of a portion of a bore hole showing the unexpanded plug within the bore hole.

FIG. 2 is a vertical section similar to FIG. 1 but showing the plug in elevation, expanded to seal against the wall of the bore hole.

FIG. 3 is a sectional view of the top portion of the bore hole showing the means for capping the water flow pipe at a convenient level below the surface of the ground and readily available for uncapping for future use of the water below the expandable plug.

FIG. 4 is an enlarged vertical section of the top end cap shown in FIG. 1.

FIG. 5 is a plan view of the lower closure cap of the expandable plug.

Referring to the drawings, the inflatable plug 5 consists of a tubular bag of suitable material which will withstand internal fluid pressure and will conform, when expanded, to the rough surface 6 of a bore hole 7.

The tubular bag 5 is fastened at both ends in the annular recesses 8 of the end caps 9 by means of the clamping rings 10.

A fluid inlet pipe 11 has its lower end threaded into an aperture 12 in the upper end cap 9 whereby fluid under pressure can be pumped into the bag 5. A check valve 13 is located in the pipe 11 acts to retain the pressure fluid in the bag 5 when the bag is inflated.

A pipe 11a is threadingly engaged with the check valve 13. This pipe 11a can be disengaged from the check valve and be withdrawn out of the bore hole 7 once the bag 5 is inflated to seal the bore hole.

Each of the end caps 9 is provided with an aperture 14 which has a peripheral recess 15 intermediate the length of the aperture to provide a seat for the "O" ring 16 as shown in FIG. 4. A pipe 17 is passed through the aperture 14 in both the upper and lower end caps 9 and is sealed therein by the "O" rings 16, while permitting movement of the end caps on the pipe.

A stop ring 18 about the pipe 17 locates the lower end cap 9 of the inflatable bag 5 on the pipe adjacent to the lower open end 19 of the pipe 17. A pipe coupling 20 connects the upper end of the pipe 17 with the pipe 21. The coupling 20 is located at a predetermined location above the upper end cap 9 when the bag 5 is uninflated as shown in FIG. 1 and acts as a stop for the upper end cap 9 when the bag 5 is inflated as shown in FIG. 2. The stop 18 and the coupling 20 limit the longitudinal expansion of the bag 5 and permit a maximum expansion of the bag radially against the wall 6 of the bore 7 without the possibility of rupturing the bag.

In the operation of the above described inflatable expansion plug, the assembled device is lowered into the bore hole 7 by means of the pipes 17 and 21 to a desired location. Fluid under pressure is pumped into the bag 5 through the pipes 11a and 11 until the bag is expanded into sealing contact with the surface 6 of the bore hole 7, and the pressure of the fluid is maintained within the bag by the check valve 13. The "O" rings 16 in the end caps 9 prevent leakage of fluid from the bag while permitting the end caps to take up a position against the lower stop 18 and against the coupling 20 as the bag is inflated. The pipe 11a can now be disengaged from the check valve 13.

The pipe 21 coupled to the pipe 17 extends above ground level and permits any water in the bore hole below the inflated bag 5 to drain off permitting the area of the bore hole above the inflated bag to remain dry suitable for the normal operation of setting a cement plug 22 for sealing the bore hole.

Should the bore hole encounter water and become in fact an artesian well, the water will pass up through the pipes 17 and 21 and be drained off or be put to immediate use by the owner of the area. However, should the water not be required for immediate use, the pipe 21 can be cut off a short distance below the surface, and be capped by the cap 23. A suitable marker 24 can be set either in the cement plug 22 or adjacent to it so that the capped end of the pipe 21 can be relocated at a later date and the well be put into use.

What I claim is:

1. A fluid pressurized shothole plug and water control device for sealing off a bore hole, said device comprising an inflatable vertically elongated tubular bag which is expansible both radially and longitudinally while being inflated, upper and lower end caps having the respective upper and lower ends of said bag secured thereto, a fluid inlet pipe connected to the upper end cap in communication with the interior of said bag for delivering fluid under pressure thereinto and expanding the same as aforesaid, a fluid upflow pipe extending through both said end caps and through said bag and having an open lower end located below the lower end cap, at least one of said end caps being slidable longitudinally on said upflow pipe to permit longitudinal expansion of the bag during inflation, and a stop provided on the upflow pipe at a point spaced longitudinally from the slidable end cap when the bag is not inflated, said slidable end cap being engageable with said stop to limit longitudinal expansion of the bag during inflation.

2. The device as defined in claim 1 which is further characterized in that the second of said end caps is also longitudinally slidable on said upflow pape and a second stop is provided on the upflow pipe for the second end cap, the longitudinal spacing of the first and second mentioned stops on said upflow pipe being greater than the unexpanded length of said bag including its end caps.

3. The device as defined in claim 1 together with a check valve provided in said fluid inlet pipe above said upper end cap and permitting fluid flow into said bag only, a portion of said inlet pipe above said check valve being removable after the bag has been inflated.

4. The device as defined in claim 1 wherein said upper and lower end caps are provided with aligned apertures having said upflow pipe extending therethrough, and sealing rings mounted in said apertures to prevent leakage of fluid from said bag.

References Cited

UNITED STATES PATENTS

| | | | |
|---|---|---|---|
| 2,605,637 | 8/1952 | Rhoades | 166—187 X |
| 2,643,722 | 6/1953 | Lynes et al. | 166—187 X |
| 2,781,852 | 2/1957 | Rumble | 166—187 X |
| 2,851,111 | 9/1958 | Jones | 166—122 |
| 2,942,666 | 6/1960 | True et al. | 166—187 X |
| 3,039,533 | 6/1962 | Lacey | 166—187 X |
| 3,125,163 | 3/1964 | Smith | 166—187 |

DAVID H. BROWN, Primary Examiner